United States Patent
Song (10) Patent No.: US 7,965,466 B1
(45) Date of Patent: Jun. 21, 2011

(54) EQUALIZATION AND DETECTION

(75) Inventor: Hongwei Song, Longmont, CO (US)

(73) Assignee: Marvell International Ltd., Hamilton (BM)

(*) Notice: Subject to any disclaimer, the term of this patent is extended or adjusted under 35 U.S.C. 154(b) by 381 days.

(21) Appl. No.: 12/121,656

(22) Filed: May 15, 2008

Related U.S. Application Data (60) Provisional application No. 60/938,813, filed on May 18, 2007.

(51) Int. Cl.
*G11B 5/035* (2006.01)
(52) U.S. Cl. .......................................... 360/65; 375/346
(58) Field of Classification Search .................. None
See application file for complete search history.

(56) References Cited

U.S. PATENT DOCUMENTS

| | | | | |
|---|---|---|---|---|
| 6,690,739 | B1* | 2/2004 | Mui | 375/265 |
| 6,734,920 | B2* | 5/2004 | Ghosh et al. | 348/614 |
| 7,006,566 | B2* | 2/2006 | Birru | 375/233 |
| 7,274,745 | B2* | 9/2007 | Chang et al. | 375/265 |
| 7,315,591 | B2* | 1/2008 | Daishin et al. | 375/344 |
| 7,483,478 | B2* | 1/2009 | Kikugawa et al. | 375/229 |
| 2005/0259551 | A1* | 11/2005 | Kudo et al. | 369/59.22 |

* cited by examiner

*Primary Examiner* — Jason C Olson (57) ABSTRACT

Systems, methods and devices for equalization include a first adaptive equalizer to process read data or write data to respectively produce equalized read data or write data; a first detector to detect the equalized read data or the equalized write data to respectively produce detected read data or detected write data; a first comparator to determine an adjustment input based on a comparison of the equalized read data to the detected read data, or the equalized write data to the detected write data; and a second adaptive equalizer to process refined equalized read data or refined equalized write data to respectively produce twice equalized read data or twice equalized write data. The refined equalized read data or the refined equalized write data is respectively produced based on (i) the equalized read data and the adjustment input or (ii) the equalized write data and the adjustment input.

22 Claims, 7 Drawing Sheets

EQUALIZATION AND DETECTION

CROSS-REFERENCE TO RELATED APPLICATIONS

This application claims priority to U.S. Provisional Application Ser. No. 60/938,813, for "Dual-Equalizer, Dual-Detector Architecture," filed on May 18, 2007, which provisional patent application is incorporated by reference herein in its entirety.

TECHNICAL FIELD

The subject matter of this patent application relates to signal processing.

BACKGROUND

When an input (e.g., input signal) passes through a channel, temporal and frequency spreading of the input can occur. An equalizer can be used to process, or equalize, the frequency response of the input to minimize the effects of spreading on the input. The effects of spreading can reduce the integrity of an input enough to prevent a detector from detecting the original input.

Conventional methods of equalization and detection typically use a single equalizer and a single detector. For example, conventional methods of equalization can use a least mean squares (LMS) filter, or a filter that uses a LMS algorithm to equalize an input. A LMS algorithm can be used to determine the difference between a target input and an actual input. LMS filters attempt to reduce both inter-symbol interference (ISI) and noise. Conventional LMS filters are not, however, optimized to minimize either ISI or noise; therefore, LMS filters cannot guarantee the best bit error rate (BER) performance. As another example, conventional methods of equalization can use a zero forcing (ZF) filter, or a filter that uses a ZF algorithm. A ZF filter uses the reciprocal of a channel response to minimize the ISI created by the channel. Conventionally, the ZF filter is optimized to minimize ISI (e.g., eliminate ISI), but the ZF filter can substantially amplify noise where the channel response has a small magnitude. In particular, as the channel response (e.g., H(s)) approaches zero, the reciprocal of the channel response $$\left(e.g., \frac{1}{H(s)}\right)$$

approaches infinity.

SUMMARY

Systems, methods, and apparatuses including computer program products are described for dual-equalization and detection.

In one aspect, a device is provided that includes a first adaptive equalizer to process read or write data to produce equalized read or write data; a first detector to detect the equalized read or write data to produce detected read or write data; and a second adaptive equalizer to process the detected read or write data to produce twice equalized read or write data.

One or more implementations can optionally include one or more of the following features. The hard disk drive can further include a second detector to detect the twice equalized read or write data.

In another aspect, a method is provided that includes equalizing an input, producing an equalized input; detecting the equalized input, producing a detected input; and equalizing the detected input, producing a twice equalized input. Other embodiments of this aspect include corresponding systems, apparatus, and computer program products.

One or more implementations can optionally include one or more of the following features. The method can also include detecting the twice equalized input. The method can further include filtering a feedback signal used by the equalizing steps. Equalizing the input can be optimized for reducing noise associated with the input, and equalizing the detected input can be optimized for reducing inter-symbol interference of the detected input. Equalizing the input can use a least mean squares filter, and equalizing the detected input can use a zero forcing filter. The one or more of the equalizing steps can use a combination of a plurality of adaptive filters. Detecting can include using Viterbi detectors.

In another aspect, a method is provided that includes decreasing a bit error rate associated with processing an input including: equalizing the input to reduce noise associated with the input, producing an equalized input; detecting the equalized input, producing a detected input; equalizing the detected input to reduce inter-symbol interference of the input, producing a twice equalized input; and detecting the twice equalized input.

One or more implementations can optionally include one or more of the following features. Equalizing the input can include using a least mean squares filter, and equalizing the detected input can include using a zero forcing filter. The one or more of the equalizing steps can use a combination of a plurality of adaptive filters. Detecting can include using Viterbi detectors.

In another aspect, a system is provided that includes a first adaptive equalizer to receive an input, process the input, and produce an equalized input, the first adaptive equalizer being coupled to a first detector, a first comparator, a second comparator, and a second adaptive equalizer; the first detector to receive the equalized input, detect the equalized input, and produce an equalized detected input, the first detector being coupled to a reconstruction filter; the reconstruction filter to receive the equalized detected input, smooth the equalized detected input, and produce a smoothed, equalized detected input, the reconstruction filter being coupled to the first comparator; the first comparator to compare the equalized input to the smoothed, equalized detected input, and produce an adjustment input, the first comparator being coupled to a filter; the filter to process the adjustment input, and produce a filtered adjustment input, the filter being coupled to the second comparator; the second comparator to compare the equalized input to the filtered adjustment input, and produce a refined equalized input, the second comparator being coupled to the second adaptive equalizer; the second adaptive equalizer to process the refined equalized input, and produce a twice equalized input, the second adaptive equalizer being coupled to a second detector; and the second detector to detect the twice equalized input, and produce a twice equalized detected output.

One or more implementations can optionally include one or more of the following features. The first adaptive equalizer can be coupled to the second comparator through a first delay module and a second delay module.

The details of one or more embodiments of the invention are set forth in the accompanying drawings and the description below. Other features and advantages of the invention will be apparent from the description and drawings, and from the claims.

DETAILED DESCRIPTION

Figure 1:
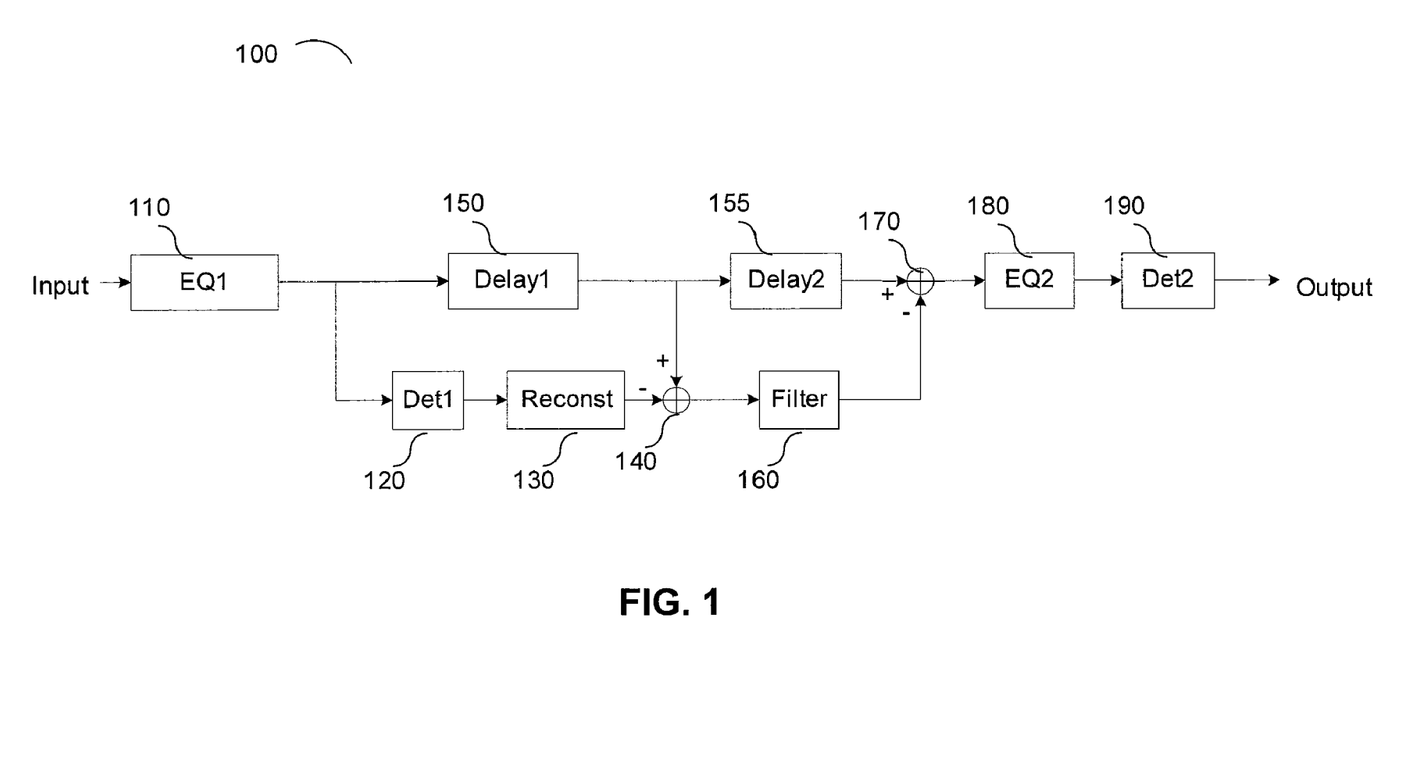
FIG. 1 is a conceptual block diagram of an example dual-equalizer, dual-detector architecture.

FIG. 1 is a conceptual block diagram of an example dual-equalizer, dual-detector architecture 100. The dual-equalizer, dual-detector architecture 100 includes a first equalizer 110 (e.g., an adaptive finite impulse response filter), a first detector 120 (e.g., a Viterbi detector), a reconstruction filter 130, a first comparator 140, a first delay module 150, a second delay module 155, a filter 160, a second comparator 170, a second equalizer 180 (e.g., an adaptive finite impulse response filter), and a second detector 190 (e.g., a Viterbi detector).

The first equalizer 110 can be coupled to the first detector 120, the first comparator 140 (through the first detector 120 coupled to the reconstruction filter 130), the second comparator 170 (through the first delay module 150 coupled to the second delay module 155), and the second equalizer 180 (through the second comparator 170). The first comparator 140 can be coupled to the second comparator 170 (through the filter 160). The second comparator 170 can be coupled to the second equalizer 180. The second equalizer 180 can be coupled to the second detector 190.

The first equalizer 110 and the second equalizer 180 can be adaptive equalizers (e.g., equalizers that use adaptive filters). An adaptive filter can adapt its transfer function according to an optimizing algorithm. The adaptive filter can receive an input, use the associated transfer function to process (e.g., equalize) the input according to characteristics of the channel, and produce an equalized input.

In some implementations, an adaptive filter can be a digital infinite impulse response (IIR) filter or a finite impulse response (FIR) filter. An infinite impulse response filter has internal feedback and an impulse response (e.g., response to a Kronecker delta input) function which is non-zero over an infinite amount of time. In some implementations, finite impulse response filters have fixed-duration impulse responses that settle to zero in a finite number of sample intervals. For example, the first equalizer 110 can be of the form of an adaptive finite impulse response filter that can adapt its transfer function according to an LMS algorithm. The first equalizer 110 can reduce both ISI and noise.

In some implementations, the first and second equalizers 110 and 180 can be selected from a combination of a plurality of filters. For example, the equalizers can use filtering methods including, but not limited to, LMS, nominal LMS, frequency-domain methods, lattice methods, recursive least squares (RLS), block RLS, IIR, and centered-moving-average (CMA). In some implementations, each equalizer can also use a hybrid of filtering methods. For example, the first equalizer can use an adaptive filter that uses a hybrid of an LMS algorithm and a ZF algorithm. Other implementations are possible.

A detector can receive an input (e.g., equalized input from an adaptive filter), detect the input, and produce an equalized detected input. In some implementations, the first and the second detectors 120 and 190 can be implemented using Viterbi detectors. A Viterbi detector uses the Viterbi algorithm to detect a convolutionally encoded stream. The Viterbi algorithm is a dynamic programming algorithm for finding the most likely sequence of hidden states (e.g., detected bits in an encoded input signal) that results in a sequence of observed events (e.g., the encoded input signal). For example, the first and second detectors 120 and 190 can be used to detect equalized inputs from the first equalizer 110 and the second equalizer 180, respectively.

The first and second detectors 120 and 190 can also be implemented using sequential detecting algorithms. For example, Fano detectors that use the Fano algorithm can be used to detect a convolutionally encoded stream. In some implementations, the first and second detectors 120 and 190 can be different types of detectors (e.g., detectors that use different algorithms for detecting). For example, the first detector 120 can be a Viterbi detector and the second detector 190 can be a Fano detector. Other implementations are possible.

The reconstruction filter 130 can be used to smooth and reconstruct an input (e.g., a signal). For example, the reconstruction filter 130 can receive an equalized detected input, smooth the input, and produce a smoothed, equalized detected input. In particular, the reconstruction filter 130 can use a transfer function (e.g., polynomial gain) to process the input to produce an input that corresponds to a target channel response. For example, the actual channel response can be $H(s)=1.2+0.9D$, where D represents a delay in the channel. The reconstruction filter can be used to process the input so that the output from the reconstruction filter more closely represents an input that corresponds to a target channel response (e.g., $H(s)=1+D$).

The first comparator 140 can be used to compare inputs to determine an error (e.g., noise, ISI). For example, the first comparator 140 can be used to compare the equalized input to the smoothed, equalized detected input; and produce an adjustment input (e.g., the error). In some implementations, the error is used to adapt the optimizing algorithms used by the equalizers. For example, the error can be used as feedback (e.g., a feedback signal) for the first equalizer 110. The first equalizer 110 can adapt its transfer function according to this feedback error and its optimizing algorithm. In some implementations, the feedback can be processed by a filter (e.g., filter 160) before being used by an equalizer.

The delay modules (e.g., delay module 150, delay module 155) can be used to match the timing of the comparators. For example, delay module 150 can be used so that the clock of comparator 140 matches the timing of the inputs to the comparator 140. As another example, delay module 150 and delay module 155 can be used so that the clock of comparator 170 matches the timing of the inputs to the comparator 170.

The filter 160 can be used to process the adjustment input and produce a filtered adjustment input. For example, filter 160 can be used to further smooth the adjustment input and process the adjustment input so that the output from the filter 160 (e.g., a filtered adjustment input) more closely represents an input that corresponds to a target channel response (e.g., $H(s)=1+2D$).

The second comparator 170 can be used to compare the equalized input to the filtered adjustment input and produce a refined equalized input. For example, comparator 170 can be used to remove error from the equalized input (e.g., error introduced by the first equalizer 110).

The second equalizer 180 can be used to equalize the input. The second equalizer 180 can be used to process the refined equalized input, and produce a twice equalized input. The second equalizer 180 can be optimized to reduce a different error characteristic, or effect of channel spreading, from the first detector 120. For example, the second equalizer 180 can be optimized to minimize ISI. In particular, the second equalizer 180 can adapt its transfer function according to a ZF algorithm.

The first equalizer 110 and first detector 120 can be optimized for loop performance. In some implementations, a minimum mean-square error (MMSE) algorithm can be used to minimize variance, and a linear Viterbi detector can be used to reduce loop latency. A MMSE equalizer minimizes the total power of the noise and ISI components. In some implementations, the first equalizer 110 can use an optimization algorithm to reduce both ISI and noise (e.g., LMS algorithm).

The second detector 190 can be used to detect the twice equalized input, and produce a twice equalized detected output. As described previously, the second detector 190 can be a different type of detector from the first detector 120.

Because the noise has already been reduced, the second equalizer 180 can be optimized for BER performance. For example, an optimization algorithm that minimizes the residual ISI at the risk of increasing the reduced noise (e.g., ZF algorithm) can be used with a nominal line voltage (NLV) detector. In some implementations, a plurality of equalizers and detectors can be used to further optimize BER performance.

Figure 2:
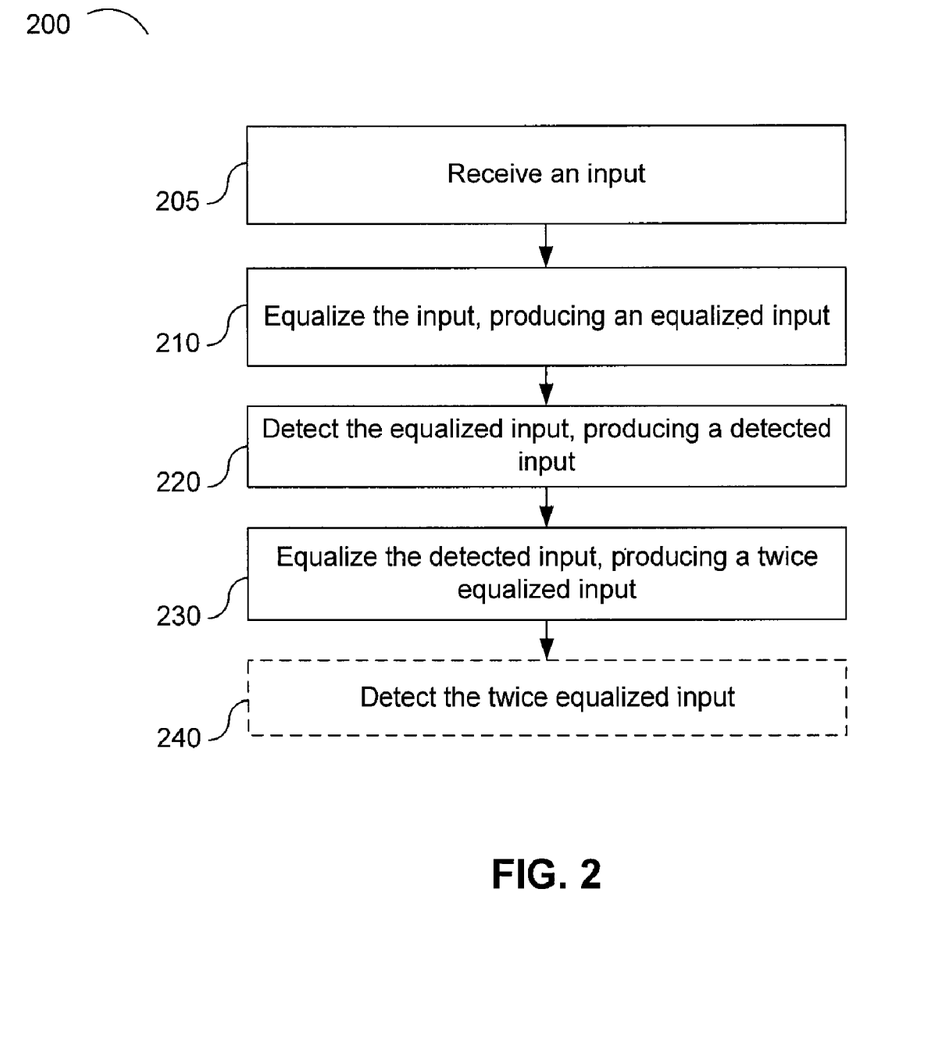
FIG. 2 is a flow chart showing an example process for twice equalizing and detecting an input.

FIG. 2 is a flow chart showing an example process 200 for twice equalizing and twice detecting an input. For convenience, the process 200 will be described with respect to a system that performs the process 200. An input (e.g., an encoded input signal) is received 205. The input is equalized 210, producing an equalized input. For example, the input can be provided to the first equalizer 110, producing an output that is of the form of an equalized input. The equalized input is detected 220, producing a detected input. For example, the first detector 120 can detect the equalized input, producing a detected input. The detected input can be equalized 230, producing a twice equalized input. For example, the second equalizer 180 can receive the detected input and produce the twice equalized input. Optionally, the twice equalized input is detected 240 a second time to complete the process. For example, the second detector 190 can detect the twice equalized input.

Figure 3:
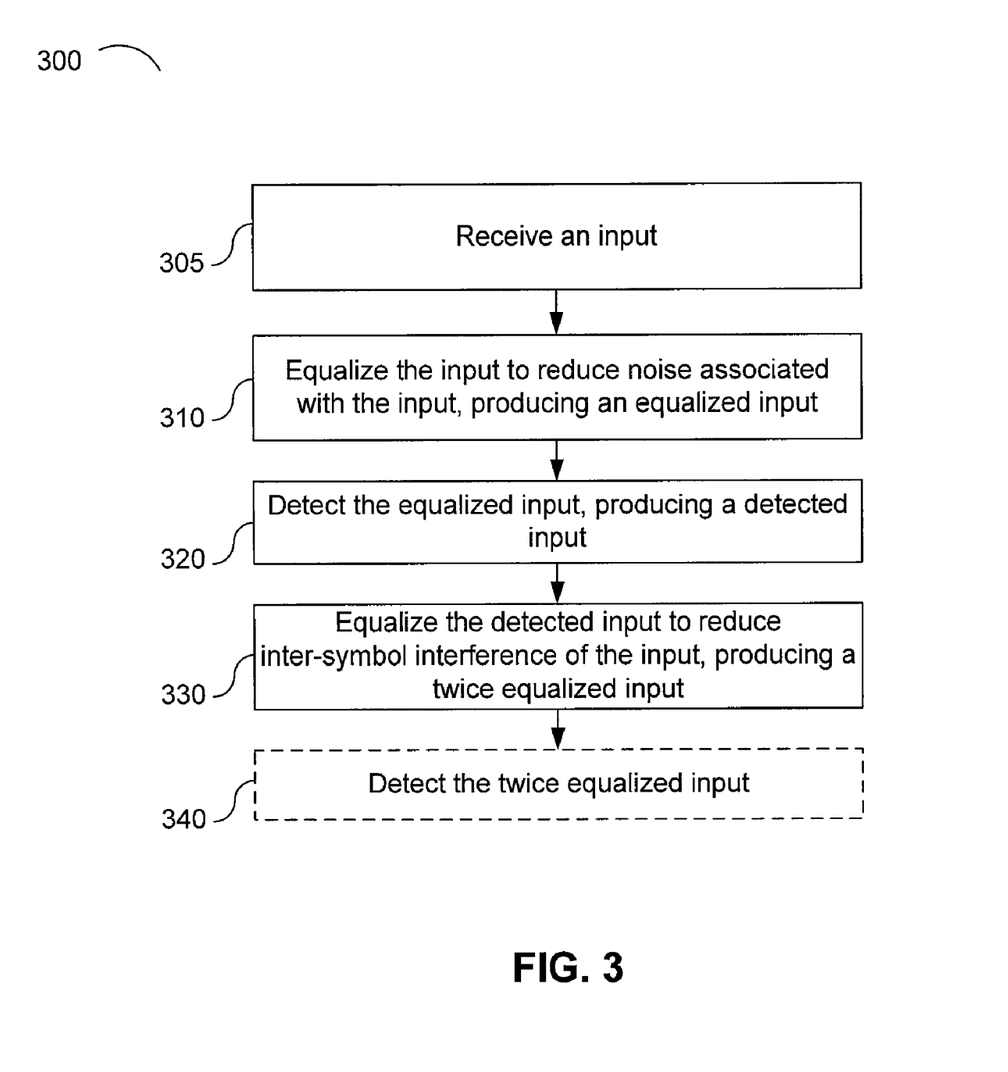
FIG. 3 is a flow chart showing an example process for decreasing a bit error rate associated with processing an input.

FIG. 3 is a flow chart showing an example process 300 for decreasing a bit error rate associated with processing an input. For convenience, the process 300 will be described with respect to a system that performs the process 300. An input (e.g., an encoded input signal) is received 305. The input is equalized 310 to reduce noise associated with the input, producing an equalized input. For example, the first equalizer 110 can use a LMS filter to equalize the input to reduce noise associated with the input, producing an output that is of the form of an equalized input. The equalized input is detected 320, producing a detected input. For example, the first detector 120 can detect the equalized input, producing a detected input. The detected input can be further equalized 330 to reduce inter-symbol interference of the input, producing a twice equalized input. For example, the second equalizer 180 can use a ZF filter to equalize the detected input to reduce inter-symbol interference of the input. The twice equalized input is detected 340 to complete the process. For example, the second detector 190 can detect the twice equalized input.

Figure 4A:
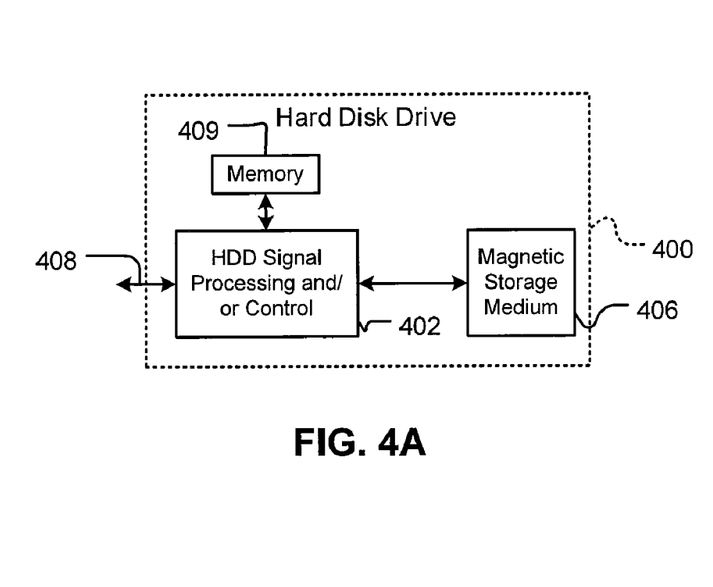
FIGS. 4A-4G show various exemplary implementations of the described systems and techniques.

FIGS. 4A-4G show various exemplary implementations of the described systems and techniques. Referring now to FIG. 4A, the described systems and techniques can be implemented in a hard disk drive (HDD) 400. The described systems and techniques may be implemented in either or both signal processing and/or control circuits, which are generally identified in FIG. 4A at 402. In some implementations, the signal processing and/or control circuit 402 and/or other circuits (not shown) in the HDD 400 may process data, perform coding and/or encryption, perform calculations, and/or format data that is output to and/or received from a magnetic storage medium 406.

The HDD 400 may communicate with a host device (not shown) such as a computer, mobile computing devices such as personal digital assistants, cellular phones, media or MP3 players and the like, and/or other devices via one or more wired or wireless communication links 408. The HDD 400 may be connected to memory 409 such as random access memory (RAM), low latency nonvolatile memory such as flash memory, read only memory (ROM) and/or other suitable electronic data storage.

Figure 4B:
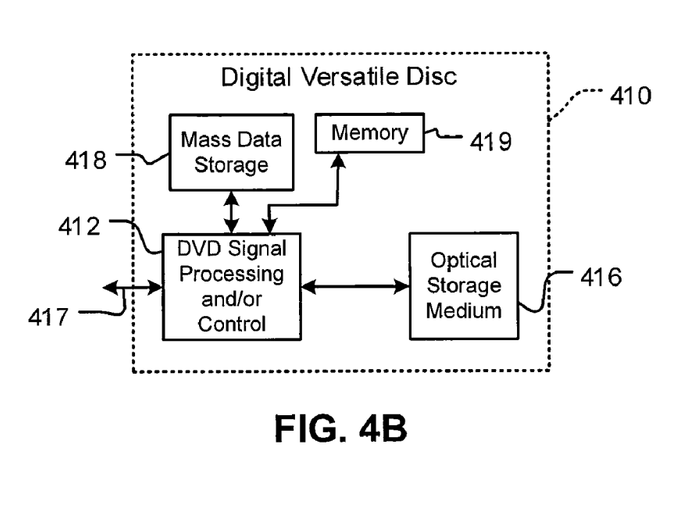

Referring now to FIG. 4B, the described systems and techniques can be implemented in a digital versatile disc (DVD) drive 410. The described systems and techniques may be implemented in either or both signal processing and/or control circuits, which are generally identified in FIG. 4B at 412, and/or mass data storage of the DVD drive 410. The signal processing and/or control circuit 412 and/or other circuits (not shown) in the DVD drive 410 may process data, perform coding and/or encryption, perform calculations, and/or format data that is read from and/or data written to an optical storage medium 416. In some implementations, the signal processing and/or control circuit 412 and/or other circuits (not shown) in the DVD drive 410 can also perform other functions such as encoding and/or decoding and/or any other signal processing functions associated with a DVD drive.

The DVD drive 410 may communicate with an output device (not shown) such as a computer, television or other device via one or more wired or wireless communication links 417. The DVD drive 410 may communicate with mass data storage 418 that stores data in a nonvolatile manner. The mass data storage 418 may include a hard disk drive (HDD). The HDD may have the configuration shown in FIG. 4A. The HDD may be a mini HDD that includes one or more platters having a diameter that is smaller than approximately 1.8". The DVD drive 410 may be connected to memory 419 such as RAM, ROM, low latency nonvolatile memory such as flash memory and/or other suitable electronic data storage.

Figure 4C:
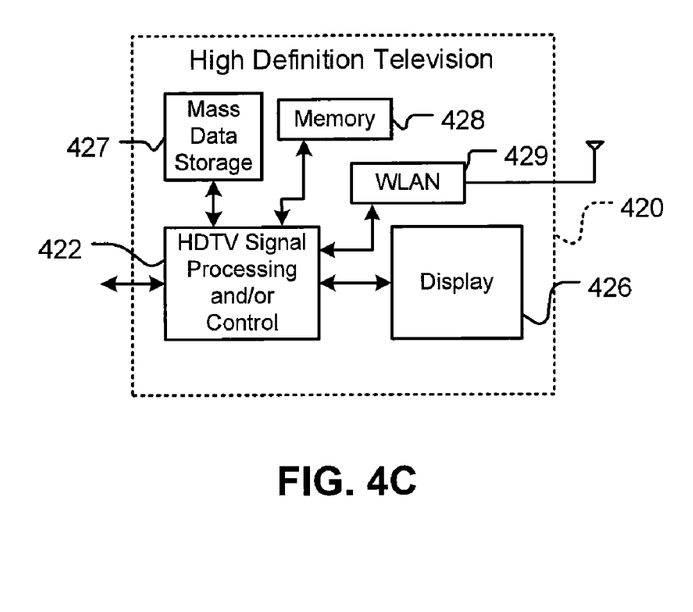

Referring now to FIG. 4C, the described systems and techniques can be implemented in a high definition television (HDTV) 420. The described systems and techniques may be implemented in either or both signal processing and/or control circuits, which are generally identified in FIG. 4C at 422, a WLAN interface and/or mass data storage of the HDTV 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN interface 429.

Figure 4D:
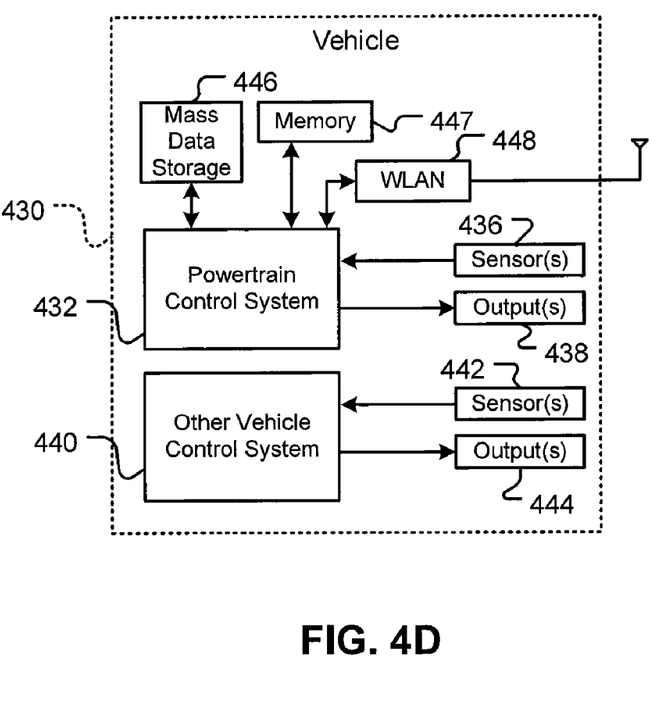

Referring now to FIG. 4D, the described systems and techniques may be implemented in a control system of a vehicle 430, a WLAN interface and/or mass data storage of the vehicle control system. In some implementations, the described systems and techniques may be implemented in a powertrain control system 432 that receives inputs from one or more sensors 436 such as temperature sensors, pressure sensors, rotational sensors, airflow sensors and/or any other suitable sensors and/or that generates one or more output control signals such as engine operating parameters, transmission operating parameters, braking parameters, and/or other control signals to one or more output devices 438.

The described systems and techniques may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The powertrain control system 432 may be connected to memory 447 such as RAM, ROM, low latency nonvolatile memory such as flash memory and/or other suitable electronic data storage. The powertrain control system 432 also may support connections with a WLAN via a WLAN interface 448. The control system 440 may also include mass data storage, memory and/or a WLAN interface (all not shown).

Figure 4E:
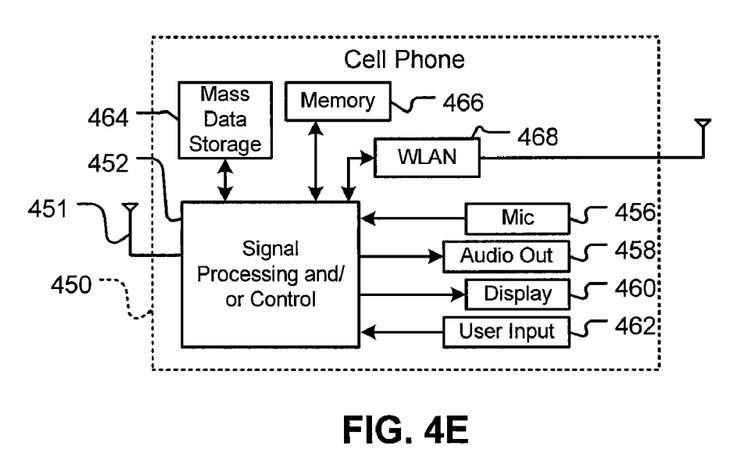

Referring now to FIG. 4E, the described systems and techniques can be implemented in a cellular phone 450 that may include a cellular antenna 451. The described systems and techniques may be implemented in either or both signal processing and/or control circuits, which are generally identified in FIG. 4E at 452, a WLAN interface and/or mass data storage of the cellular phone 450. In some implementations, the cellular phone 450 includes a microphone 456, an audio output 458 such as a speaker and/or audio output jack, a display 460 and/or an input device 462 such as a keypad, pointing device, voice actuation and/or other input device. The signal processing and/or control circuits 452 and/or other circuits (not shown) in the cellular phone 450 may process data, perform coding and/or encryption, perform calculations, format data and/or perform other cellular phone functions.

The cellular phone 450 may communicate with mass data storage 464 that stores data in a nonvolatile manner such as optical and/or magnetic storage devices for example hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The cellular phone 450 may be connected to memory 466 such as RAM, ROM, low latency nonvolatile memory such as flash memory and/or other suitable electronic data storage. The cellular phone 450 also may support connections with a WLAN via a WLAN interface 468.

Figure 4F:
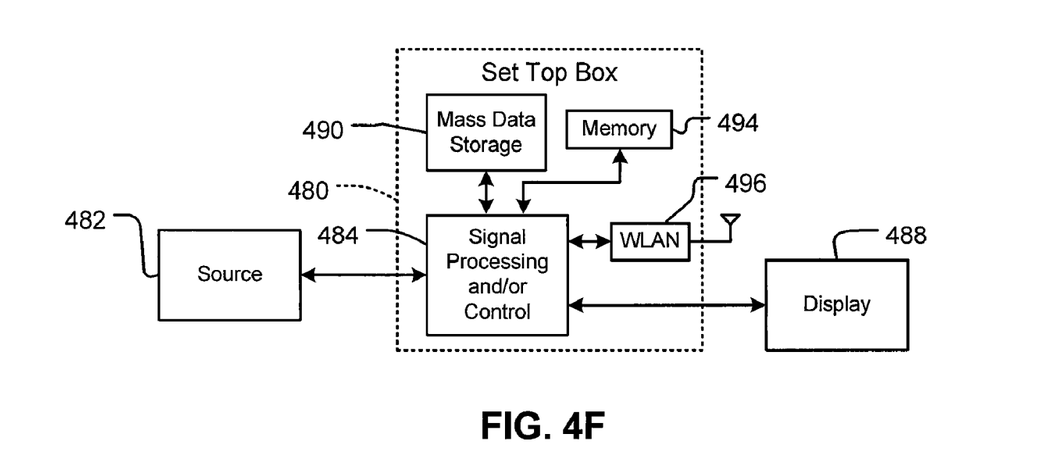

Referring now to FIG. 4F, the described systems and techniques can be implemented in a set top box 480. The described systems and techniques may be implemented in either or both signal processing and/or control circuits, which are generally identified in FIG. 4F at 484, a WLAN interface and/or mass data storage of the set top box 480. The set top box 480 receives signals from a source 482 such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN interface 496.

Figure 4G:
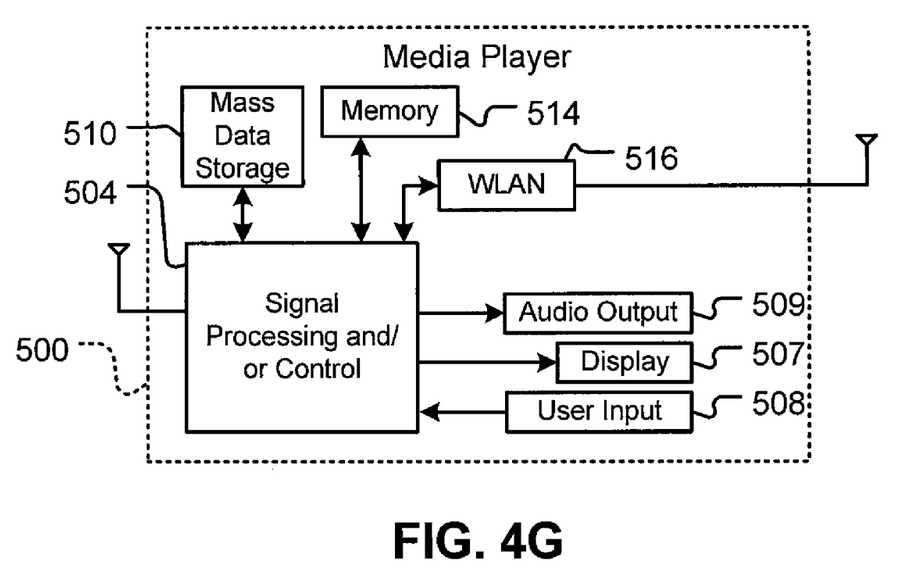

Referring now to FIG. 4G, the described systems and techniques can be implemented in a media player 500. The described systems and techniques may be implemented in either or both signal processing and/or control circuits, which are generally identified in FIG. 4G at 504, a WLAN interface and/or mass data storage of the media player 500. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 4A and/or at least one DVD drive may have the configuration shown in FIG. 4B. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN interface 516. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A device comprising:
    a first adaptive equalizer to process read data or write data to respectively produce equalized read data or write data;
    a first detector to detect the equalized read data or the equalized write data to respectively produce detected read data or detected write data;
    a first comparator to determine an adjustment input based on a comparison of the equalized read data to the detected read data, or the equalized write data to the detected write data; and
    a second adaptive equalizer to process refined equalized read data or refined equalized write data to respectively produce twice equalized read data or twice equalized write data, the refined equalized read data or the refined equalized write data being respectively produced based on (i) the equalized read data and the adjustment input or (ii) the equalized write data and the adjustment input.

2. The device of claim 1, further comprising:
    a second detector to detect the twice equalized read data or the twice equalized write data.

3. The device of claim 1, further comprising a second comparator to compare the equalized read data or the equalized write data to the adjustment input to respectively produce the refined equalized read data or the refined equalized write data.

4. The device of claim 3, wherein the second comparator compares the equalized read data or the equalized write data to a filtered version of the adjustment input to produce the refined equalized read data or the refined equalized write data.

5. A method comprising:
    performing a first equalization of an input to produce an equalized input;
    detecting the equalized input to produce a detected input; and
    performing a second equalization of the detected input to produce a twice equalized input,
    wherein the first equalization has better noise reduction capability compared to the second equalization, and the second equalization has better inter symbol interference reduction capability compared to the first equalization.

6. The method of claim 5, further comprising:
    detecting the twice equalized input.

7. The method of claim 6, wherein at least one of the detecting includes using Viterbi detectors.

8. The method of claim 5, wherein performing the first equalization of the input comprises using a least mean squares filter; and
    performing the second equalization of the detected input comprises using a zero forcing filter.

9. The method of claim 5, wherein one or more of the first equalization and the second equalization comprise using a combination of a plurality of adaptive filters.

10. A method comprising:
    decreasing a bit error rate associated with processing an input including:
        equalizing the input to reduce noise associated with the input using a first equalizing process, producing an equalized input;
        detecting the equalized input, producing a detected input;
        equalizing the detected input to reduce inter symbol interference of the input using a second equalizing process, producing a twice equalized input; and
        detecting the twice equalized input, wherein the first equalizing process has better noise reduction capability compared to the second equalizing process, and the second equalizing process has better inter symbol interference reduction capability compared to the first equalizing process.

11. The method of claim 10, where equalizing the input includes using a least mean squares filter, and equalizing the detected input includes using a zero forcing filter.

12. The method of claim 10, where one or more of the equalizing steps use a combination of a plurality of adaptive filters.

13. The method of claim 10, where at least one of the detecting includes using Viterbi detectors.

14. A system comprising:
   means for equalizing an input to produce an equalized input;
   means for detecting the equalized input to produce a detected input;
   means for determining an adjustment input based on a comparison of the equalized input and the detected input;
   means for producing a refined equalized input based on a comparison of the equalized input and the adjustment input; and
   means for equalizing the refined equalized input to produce a twice equalized input.

15. The system of claim 14, further comprising:
   means for detecting the twice equalized input.

16. The system of claim 15, where at least one of the means for detecting includes a Viterbi detector.

17. The system of claim 14, where the means for equalizing the input is optimized for reducing noise associated with the input, and the means for equalizing the detected input is optimized for reducing inter symbol interference of the detected input.

18. The system of claim 14, where the means for equalizing the input uses a least mean squares filter, and the means for equalizing the detected input uses a zero forcing filter.

19. The system of claim 14, where at least one of the means for equalizing use a combination of a plurality of adaptive filters.

20. The system of claim 14, wherein the means for producing a refined equalized input compares the equalized input and a filtered version of the adjustment input to produce the refined equalized input.

21. A system comprising:
   a first adaptive equalizer to receive an input, process the input, and produce an equalized input,
      the first adaptive equalizer being coupled to a first detector, a first comparator, a second comparator, and a second adaptive equalizer;
   the first detector to receive the equalized input, detect the equalized input, and produce an equalized detected input,
      the first detector being coupled to a reconstruction filter;
   the reconstruction filter to receive the equalized detected input, smooth the equalized detected input, and produce a smoothed, equalized detected input,
      the reconstruction filter being coupled to the first comparator;
   the first comparator to compare the equalized input to the smoothed, equalized detected input, and produce an adjustment input,
      the first comparator being coupled to a filter;
   the filter to process the adjustment input, and produce a filtered adjustment input,
      the filter being coupled to the second comparator;
   the second comparator to compare the equalized input to the filtered adjustment input, and produce a refined equalized input,
      the second comparator being coupled to the second adaptive equalizer;
   the second adaptive equalizer to process the refined equalized input, and produce a twice equalized input,
      the second adaptive equalizer being coupled to a second detector; and
   the second detector to detect the twice equalized input, and produce a twice equalized detected output.

22. The system of claim 21, where the first adaptive equalizer is coupled to the second comparator through (i) a first delay module and (ii) a second delay module.

* * * * *